(12) United States Patent
Wilke et al.

(10) Patent No.: US 8,862,352 B2
(45) Date of Patent: Oct. 14, 2014

(54) SYSTEM AND METHOD FOR IMPROVED DOUBLE TRANSITION SHIFT OPERATIONS FOR AUTOMATIC TRANSMISSIONS

(75) Inventors: Nathaniel E. Wilke, Waterford, MI (US); John E. Marano, Milford, MI (US); Andrew W. Phillips, Rochester, MI (US)

(73) Assignee: GM Global Technology Operations LLC

( * ) Notice: Subject to any disclaimer, the term of this patent is extended or adjusted under 35 U.S.C. 154(b) by 433 days.

(21) Appl. No.: 13/300,039

(22) Filed: Nov. 18, 2011

(65) Prior Publication Data

US 2013/0008754 A1 Jan. 10, 2013

Related U.S. Application Data

(60) Provisional application No. 61/505,296, filed on Jul. 7, 2011.

(51) Int. Cl.
| | | |
|---|---|---|
| *G06F 17/00* | (2006.01) | |
| *F16H 61/04* | (2006.01) | |
| *F16H 61/684* | (2006.01) | |
| *F16H 61/06* | (2006.01) | |
| *F16H 59/46* | (2006.01) | |

(52) U.S. Cl.
CPC .......... *F16H 61/0437* (2013.01); *F16H 61/684* (2013.01); *F16H 61/06* (2013.01); *F16H 2059/465* (2013.01); *F16H 2306/14* (2013.01); *F16H 2061/0444* (2013.01)
USPC .............................. 701/67; 477/176; 477/180

(58) Field of Classification Search
USPC ..................................... 477/176, 180; 701/67
See application file for complete search history.

(56) References Cited

U.S. PATENT DOCUMENTS

| | | | | |
|---|---|---|---|---|
| 4,989,477 | A | * | 2/1991 | Hunter et al. ................. 477/148 |
| 5,014,573 | A | * | 5/1991 | Hunter et al. ................... 477/61 |
| 5,038,636 | A | * | 8/1991 | Vukovich et al. ............. 477/148 |
| 5,050,458 | A | * | 9/1991 | Vukovich et al. ............. 477/154 |
| 5,113,343 | A | * | 5/1992 | Hunter et al. ................... 701/51 |
| 5,304,102 | A | | 4/1994 | Narita et al. |
| 5,368,531 | A | | 11/1994 | Ando et al. |
| 5,779,594 | A | | 7/1998 | Minowa et al. |
| 6,243,637 | B1 | | 6/2001 | Minowa et al. |
| 6,334,833 | B1 | | 1/2002 | Ochi et al. |
| 6,503,165 | B1 | | 1/2003 | Kubo et al. |
| 7,056,263 | B2 | | 6/2006 | Whitton |
| 7,559,876 | B2 | * | 7/2009 | Runde et al. .................. 477/125 |
| 8,483,919 | B2 | * | 7/2013 | Byerly et al. ................... 701/60 |
| 2001/0016539 | A1 | | 8/2001 | Yuasa et al. |
| 2008/0161159 | A1 | * | 7/2008 | Runde et al. .................. 477/156 |

OTHER PUBLICATIONS

Marano, John E. et al., "Clutch-to-Clutch Transmission Control Strategy", SAE Technical Papers Series, 2007-01-1313, 2007 World Congress, Apr. 16-19, 2007, 13 pages.

\* cited by examiner

*Primary Examiner* — Derek D Knight (57) ABSTRACT

A control system for an automatic transmission includes a double transition shift detection module and first and second clutch control modules. The double transition shift detection module detects whether a double transition shift operation is requested. The first clutch control module controls two of four transitioning clutches of the transmission during an inertia phase of the double transition shift operation. The second clutch control module controls each of the four transitioning clutches of the transmission during a torque phase of the double transition shift operation.

18 Claims, 7 Drawing Sheets

SYSTEM AND METHOD FOR IMPROVED DOUBLE TRANSITION SHIFT OPERATIONS FOR AUTOMATIC TRANSMISSIONS

CROSS-REFERENCE TO RELATED APPLICATIONS

This application claims the benefit of U.S. Provisional Application No. 61/505,296, filed on Jul. 7, 2011. The disclosure of the above application is incorporated herein by reference in its entirety.

FIELD

The present disclosure relates to transmission control systems and more particularly to a system and method for improved double transition shift operations for automatic transmissions.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air/fuel (A/F) mixture within cylinders to drive pistons that rotatably turn a crankshaft and generate drive torque. The drive torque is transferred from the crankshaft to a driveline of a vehicle via a transmission. The transmission may be coupled to the crankshaft via a fluid coupling such as a torque converter. The transmission may be an automatic transmission that translates the drive torque at the crankshaft to a desired drive torque at the driveline of the vehicle. More specifically, the transmission may include a plurality of gears that are selectively engaged or disengaged to provide the desired gear ratio thereby achieving the desired drive torque at the driveline. The transmission may further include a plurality of clutches that selectively engage or disengage the gears.

SUMMARY

A control system for an automatic transmission includes a double transition shift detection module and first and second clutch control modules. The double transition shift detection module detects whether a double transition shift operation is requested. The first clutch control module controls two of four transitioning clutches of the transmission during an inertia phase of the double transition shift operation. The second clutch control module controls each of the four transitioning clutches of the transmission during a torque phase of the double transition shift operation.

A method for controlling an automatic transmission includes detecting whether a double transition shift operation is requested, controlling two of four transitioning clutches of the transmission during an inertia phase of the double transition shift operation, and controlling each of the four transitioning clutches of the transmission during a torque phase of the double transition shift operation.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors or a group of execution engines. For example, multiple cores and/or multiple threads of a processor may be considered to be execution engines. In various implementations, execution engines may be grouped across a processor, across multiple processors, and across processors in multiple locations, such as multiple servers in a parallel processing arrangement. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

A shift operation in a transmission includes a transition from a current gear (an off-going gear) to a desired gear (an on-coming gear). The transmission shift may be performed by engaging an on-coming clutch associated with the on-coming gear and disengaging an off-going clutch associated with the off-going gear. The transmission shift may be divided into two phases: a torque phase and an inertia phase. An upshift refers to a shift operation to a higher gear (or a lower gear ratio) during which the torque phase precedes the inertia phase. A downshift, on the other hand, refers to a shift operation to a lower gear (or a higher gear ratio) during which the inertia phase precedes the torque phase.

More specifically, during the inertia phase, a clutch is controlled to adjust engine speed to a desired engine speed for the on-coming gear. During the torque phase, capacity of the on-coming clutch is increased thereby engaging the on-coming clutch while a torque capacity of the off-going clutch is decreased. In addition, a holding clutch may be applied during the transmission shift in order to slip across the transmission at less than or equal to a predetermined threshold. A double transition shift refers to a specific shift operation having two pairs of clutch transitions.

In other words, a double transition shift involves more than two clutches transitioning. For example, a double transition shift may involve two on-coming clutches and two off-going clutches. Whether or not a particular shift operation is a double transition shift depends on the transmission power flow. The transmission power flow varies depending on a design of the transmission. Therefore, a jump or skip shift (a shift of more than one gear, such as $6^{th}$ to $4^{th}$) may not necessarily be a double transition shift, but a single step shift (a shift of one gear, such as $4^{th}$ to $5^{th}$) may be a double transition shift.

Double transition shifts in typical transmissions, which require two engaged clutches for each gear ratio, do not have a common holding clutch. Therefore, typical transmission control systems perform double transition shifts in two sequential stages or periods. The first period includes engaging a first on-coming clutch and disengaging a first off-going clutch while controlling slip via the first off-going clutch and a first holding clutch. The second period includes engaging a second on-coming clutch and disengaging a second off-going clutch while controlling slip via the second off-going clutch a second holding clutch. Performing double transition shifts in sequential stages (or periods) increases shift time.

Accordingly, a system and method are presented for improved double transition shift operations. The system and method are directed to performing double transition shift operations in parallel stages as opposed to sequential stages thereby decreasing shift time. More specifically, the system and method may control four clutches (two on-coming clutches and two off-going clutches) during the torque phase and two of the four clutches during the inertia phase. The system and method may also mathematically derive torque capacity commands for the transitioning clutches. For example, the torque capacity commands may be derived using clutch slip speed targets for two of the four transitioning clutches in addition to a transmission input shaft slip speed target. The transmission input shaft slip speed target is used to determine a desired output shaft torque, which is used in determining the torque capacity commands.

Figure 1:
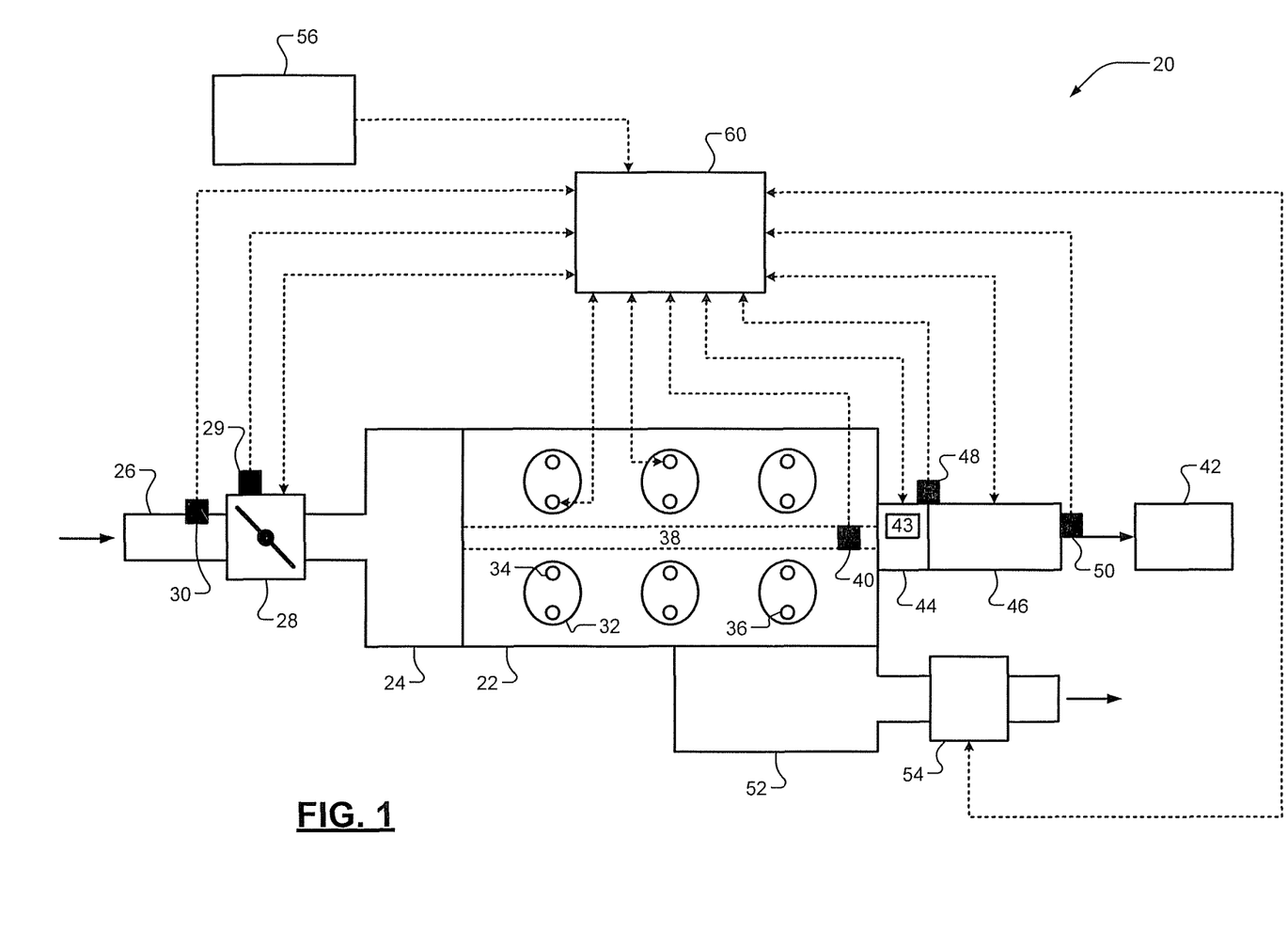
FIG. 1 is a functional block diagram of an example engine system.

Referring now to FIG. 1, an example engine system 20 includes an engine 22. The engine 22 may be a spark ignition (SI) engine, a diesel engine, a homogeneous charge compression ignition (HCCI) engine, or another suitable type of engine. The engine system 20 may also be a hybrid system and therefore may include additional components such as an electric motor and a battery system.

The engine 22 draws air into an intake manifold 24 through an induction system 26 that may be regulated by a throttle 28. For example, the throttle 28 may be electrically controlled via electronic throttle control (ETC). A throttle position sensor (TPS) 19 measures a position of the throttle 28. A mass air flow (MAF) sensor 30 measures MAF through the throttle 28. For example, the measured MAF may indicate a load on the engine 22. The air in the intake manifold 24 is distributed to a plurality of cylinders 32 and combined with fuel to create an air/fuel (A/F) mixture. While six cylinders are shown, the engine 22 may have other numbers of cylinders.

Fuel injectors 34 may inject the fuel to create the A/F mixture. For example, the fuel injectors 34 may inject the fuel into intake ports of the cylinders 32, respectively, or directly into the cylinders 32, respectively. The A/F mixture is compressed by pistons (not shown) within the cylinders 32. Depending on the type of engine 22, spark plugs 36 may ignite the compressed A/F mixture. Alternatively, the A/F mixture may be compressed until auto-ignition occurs. The combustion of the A/F mixture within the cylinders drives the pistons (not shown) which rotatably turn a crankshaft 38 and generate drive torque. An engine speed sensor 40 measures a rotational speed of the crankshaft 38 (e.g., in revolutions per minute, or RPM).

The drive torque at the crankshaft 38 is transferred to a driveline 42 of a vehicle via a transmission 46. For example, the transmission 46 may be coupled to the crankshaft 38 via a fluid coupling such as a torque converter (TC) 44. The transmission 46 includes a plurality of gear ratios for translating the drive torque at the output of the torque converter 44 (i.e., an input shaft of the transmission 46) to a desired drive torque at the driveline 42 (i.e., at an output shaft of the transmission 46). A transmission input shaft speed (TISS) sensor 48 measures a rotational speed of an input shaft of the transmission 46 (i.e., the rotational speed at the output of the torque converter 44). The TISS may also indicate a rotational speed of a turbine 43 in the torque converter 44. A transmission output shaft speed (TOSS) sensor 50 measures a rotational speed of an output shaft of the transmission 46 (i.e., the rotational speed of the vehicle driveline 42). For example, the measured TOSS may be used to determine a speed of the vehicle.

Exhaust gas resulting from combustion is expelled from the cylinders 32 into an exhaust manifold 52. The exhaust gas in the exhaust manifold 52 may be treated by an exhaust treatment system 54 before being released into the atmosphere. For example, the exhaust treatment system 54 may include at least one of an oxidation catalyst (OC), nitrogen oxide (NOx) adsorbers/absorbers, a lean NOx trap, a selective catalytic reduction (SCR) system, a particulate matter (PM) filter, and a three-way catalytic converter. A driver input module 56 translates input from the driver of the vehicle (e.g., via an accelerator pedal) for a control module 50.

The control module 50 controls operation of the engine system 20. The control module 50 may receive signals from the throttle 28, the MAF sensor 30, the fuel injectors 34, the spark plugs 36, the engine speed sensor 40, the torque converter 44, the transmission 46, the TISS sensor 48, the TOSS sensor 50, the exhaust treatment system 54, and/or the driver input module 56. The control module 50 may control the throttle 28, the fuel injectors 34, the spark plugs 36, the torque converter 44, the transmission 46, and/or the exhaust treatment system 54. The control module 50 may also implement the system or method of the present disclosure.

Figure 2:
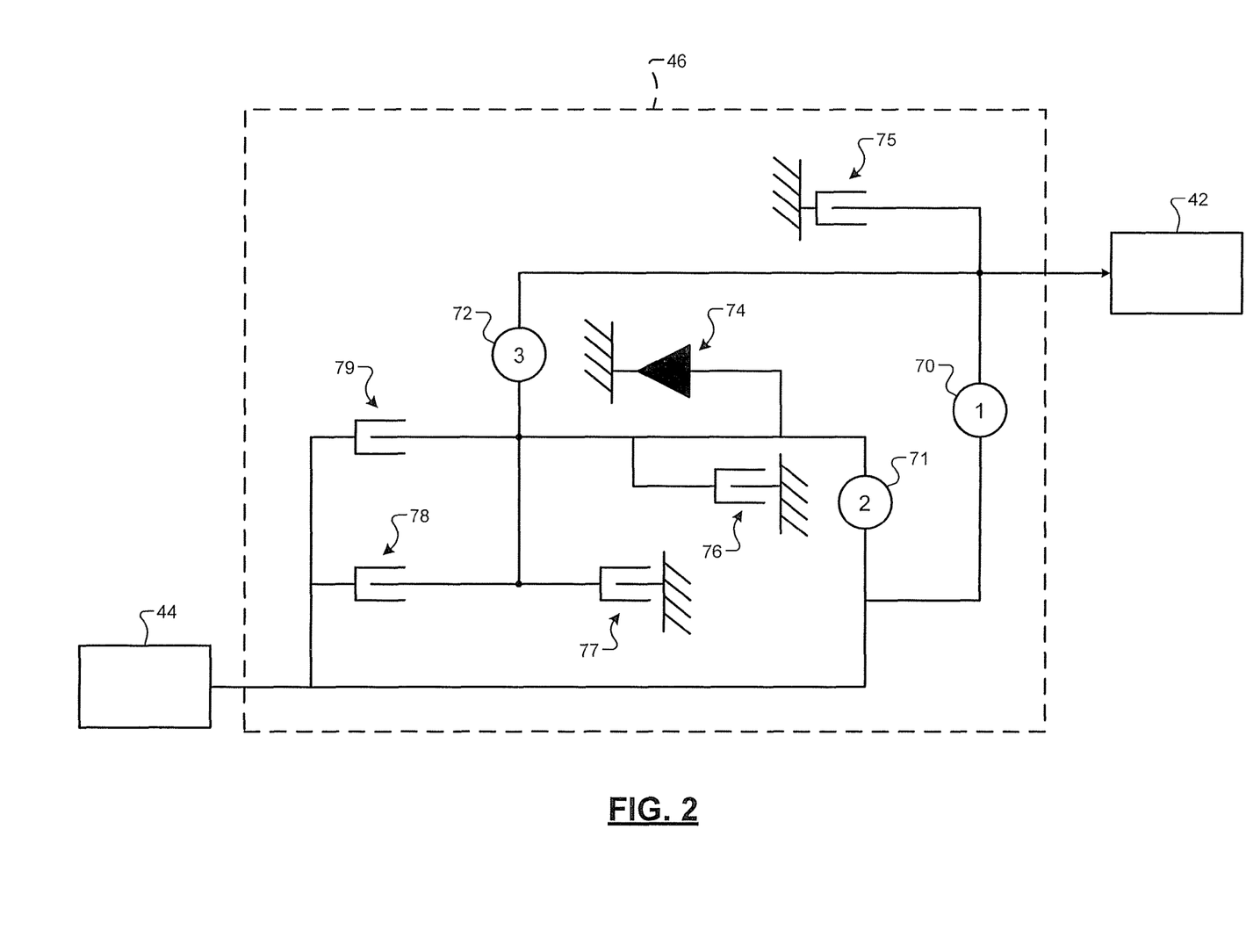
FIG. 2 is a power flow diagram of an example automatic transmission.

Referring now to FIG. 2, a power flow diagram of an example of the transmission 46 is shown. Specifically, FIG. 2 illustrates a six-speed automatic transmission. As previously described, the transmission 46 transfers drive torque from the torque converter 44 to the driveline 42. The transmission 46 includes three gears 70, 71, and 72, respectively, and six clutches 74, 75, 76, 77, 78, and 79. For example only, gear 70 may have a lower gear ratio than gears 71 and 72, and gear 71 may have a lower gear ratio than gear 72. The transmission 46 may also include other components such as, for example only, ring gears, sun gears, carrier gears, servos, etc. The control module 60 selectively engages or disengages one or more of the clutches 74-79 to engage/disengage one or more of the gears 70-72 thereby achieving a desired gear ratio for translating input torque (from torque converter 44) to output torque (to driveline 42).

Clutch 74 may also be referred to as clutch F12 or a freewheeler clutch. The freewheeler clutch 70 allows the transmission 46 to achieve a first gear ratio (i.e., gear 70) by engaging clutch 75. Clutch 75 may also be referred to as clutch CB1234 because clutch 75 is engaged to achieve each of gear ratios corresponding to gears 1, 2, 3, and 4. In addition, clutch 75 is also a braking clutch as denoted by the B in CB1234. Clutch 76 may also be referred to as clutch CBLR because clutch 76 is engaged to achieve a gear ratio corresponding to a reverse (R) gear. Clutch 77 may also be referred to as clutch CB26 because clutch 77 is engaged to achieve each of gear ratios corresponding to gears 2 and 6. Clutch 78 may also be referred to as clutch C35R because clutch 78 is engaged to achieve each of gear ratios corresponding to gears 3, 5, and R. Lastly, clutch 79 may also be referred to as clutch C456 because clutch 79 is engaged to achieve each of gear ratios corresponding to gears 4, 5, and 6.

Figure 3:
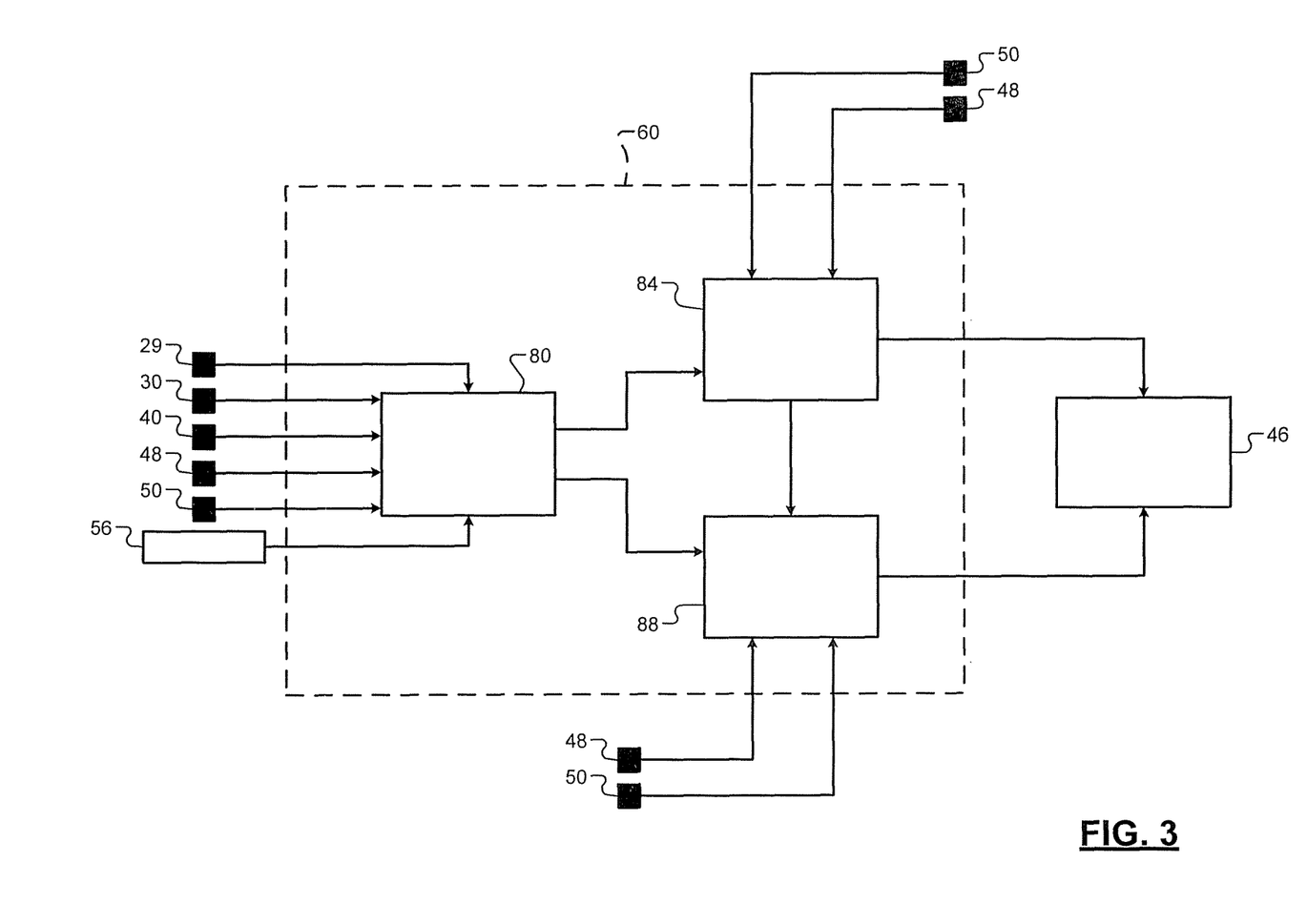
FIG. 3 is a functional block diagram of an example control module.

Referring now to FIG. 3, an example of the control module 60 is shown. The control module 60 may include a double transition shift detection module 80, a first clutch control module 84, and a second clutch control module 88. The first clutch control module 84 controls two of the four transitioning clutches during an inertia phase of the double transition shift operation, whereas the second clutch control module 88 controls the four transitioning clutches during the double transition shift operation. As previously mentioned, an order of the inertia and torque phases may vary depending on whether the double transition shift operation is a downshift or an upshift. Therefore, it is appreciated that the first and second control modules 84 and 88, respectively, do not imply an order.

The double transition shift detection module 80 detects whether a double transition shift is requested. More specifically, the double transition shift detection module 80 first detects whether a transmission shift is requested and then determines whether the requested transmission shift is a double transition shift. The double transition shift detection module 80 may first detect whether a transmission shift is requested based on various operating parameters. For example, the double transition shift detection module 80 may detect whether a transmission shift is requested based on throttle position, engine load, engine speed, TISS, TOSS, and/or driver input 56.

When a transmission shift is detected, the double transition shift detection module 80 may then determine whether the requested transmission shift is a double transition shift. As previously described, the double transition shift can be either an upshift or a downshift. This determination is based on a configuration of the transmission 46. More specifically, double transition shifts may vary from transmission to transmission. Therefore, the double transition shifts for the transmission 46 may be predetermined. For example, the double transition shifts for the transmission 46 may be stored in a look-up table. The double transition shift detection module 80 may then compare the requested shift operation to the predetermined double transition shifts to determine whether the requested shift operation is a double transition shift.

The first clutch control module 84 may receive a signal from the double transition shift detection module 80 indicating that a double transition shift is requested. When a double transition shift is requested, the first clutch control module 84 determines torque capacity commands for each of four clutches (two on-coming clutches and two off-going clutches) transitioning during the double transition shift. More specifically, the first clutch control module 84 may control four clutches during the torque phase of the double transition shift and two of the four clutches during the inertia phase of the double transition shift. As previously mentioned, for an upshift the torque phase precedes the inertia phase, whereas for a downshift the inertia phase precedes the torque phase.

For example only, both a sixth gear to third gear (6-3) power downshift (PD) shift operation and a third gear to sixth gear (3-6) upshift are now described. Each of these shifts includes controlling two of the following four clutches during the inertia phase: clutch 75 (CB1234), clutch 78 (C35R), clutch 77 (CB26), and clutch 79 (C456). In addition, each of these shifts includes controlling all four of the previously listed clutches during the torque phase. Note that no clutch is maintaining zero slip speed (holding) during either of the double transition shift operations.

The transmission 46 may be characterized by using a system of free body diagram (FBD) equations describing movement of parts within the transmission 46 as described in commonly-assigned U.S. Pat. No. 7,056,263 which is herein incorporated by reference in its entirety. More specifically, the system of equations may include torques, moments, forces, and the like. For example only, the system of equations may be defined as follows:

$$\begin{bmatrix} \dot{\omega}_i \\ \lambda \end{bmatrix} = \begin{bmatrix} I & \Phi^T \\ \Phi & 0 \end{bmatrix}^{-1} \begin{bmatrix} \sum T \\ 0 \end{bmatrix}, \tag{1}$$

where $\dot{\omega}_i$ represents acceleration, T represents torque (lever, internal, or external), $I_{n \times n}$ is a diagonal matrix of inertia values for n inertias, and $\Phi_{m \times n}$ is a matrix of constant coefficients for the m constraint equations relating the n unknown accelerations ($r_R$,($r_R$+$r_S$)/2, ... ).

Next, external torques that are known to be zero may be eliminated. The accelerations $\dot{\omega}_i$ may then be calculated in terms of external torques. For example, a clutch slip acceleration may be evaluated in terms of an external torque on another clutch. The resulting equations may be used to generally describe torque capacities for various clutches for both (i) the torque phase and (ii) a start of the inertia phase for a desired turbine acceleration $\alpha_{turbine}$:

$$T_{OFF} = aT_{OUT} + bT_{IN} + c\dot{\omega}_{TURBINE}$$

$$T_{ON} = dT_{OUT} + eT_{IN} + f\dot{\omega}_{TURBINE} \tag{2},$$

where $T_{off}$ and $T_{on}$ represent the on-coming and off-going torque capacities, respectively, $T_{in}$ represents input shaft torque, $T_{out}$ represents output shaft torque, $\omega_{turbine}$ represents turbine acceleration, and a, b, c, d, e, and f (a-f) are values representing theoretical constants for various shift types. The specific torque commands, however, may vary from those described above in Equation (2).

Rather, by applying the principles described above, the first clutch control module 84 may determine the torque capacities for controlling the clutches during the inertia phase of the double transition shift operation. The first clutch control module 84 may then control the transmission 46 based on these determined torque capacities. More specifically, in the case of the example 6-3 PD operation, the torque capacities for the off-going clutches C456 and CB26 may be determined as follows:

$$T_{C456} = a_1 T_{IN} + b_1 T_{OUT} + c_1 \dot{\omega}_{CA} + d_1 \dot{\omega}_{CB}$$

$$T_{CB26} = a_2 T_{IN} + b_2 T_{OUT} + c_2 T_{C456} + d_2 \dot{\omega}_{CA} + e_2 \dot{\omega}_{CB} \quad (3),$$

where $\dot{\omega}_{CA}$ represents a desired clutch slip acceleration for a first selected one of the four clutches CB1234, C35R, CB26, and C456 (referred to as CA), c represents a desired clutch slip acceleration for a second selected one of the four clutches listed above (referred to as CB), $T_{IN}$ represents input shaft torque, $T_{OUT}$ represents desired output shaft torque, $T_{C456}$ represents a torque capacity of clutch C456, and $a_1$, $a_2$, $b_1$, $b_2$, $c_1$, $c_2$, $d_1$, $d_2$, and $e_2$ are values representing theoretical constants for various shift types of the transmission 46.

For example only, CA may be C35R and CB may be CB1234. As stated above, however, CA and CB may be any two of the four clutches CB1234, C35R, CB26, and C456. In other words, $\dot{\omega}_{CA}$ and $\dot{\omega}_{CB}$ may be two of four possible desired clutch slip accelerations. In addition, the desired output shaft torque $T_{OUT}$ may vary as a function of input shaft acceleration ($\dot{\omega}_{IN}$). The desired output shaft torque $T_{OUT}$ may further vary based on the selected desired clutch slip accelerations. For example, the desired output shaft torque $T_{OUT}$ may be determined as follows:

$$T_{OUT} = a_6 T_{IN} + b_6 \dot{\omega}_{IN} + c_6 \dot{\omega}_{CA} + d_6 \dot{\omega}_{CB} \quad (4),$$

where $a_6$, $b_6$, $c_6$, and $d_6$ are values representing theoretical constants for various shift types of the transmission 46. In sum, three desired slip acceleration profiles/targets may be required to determine the torque commands: the input shaft acceleration $\dot{\omega}_{IN}$ and two clutch slip accelerations ($\dot{\omega}_{CA}$ and $\dot{\omega}_{CB}$) corresponding to two of the four transitioning clutches.

The second clutch control module 88, on the other hand, may determine torque capacities for controlling each of the four clutches during the torque phase of the double transition shift operation. The second clutch control module 88 may then control the transmission 46 based on these determined torque capacities. More specifically, in the case of the example 6-3 PD operation, the torque capacities for each of the off-going clutches C456 and CB26 and the on-coming clutches CB1234 and C35R may be determined as follows:

$$T_{CB1234} = a_3 T_{IN} + b_3 T_{OUT} + c_3 \dot{\omega}_{CA} d_3 \dot{\omega}_{CB}$$

$$T_{C35R} = a_4 T_{IN} + b_4 T_{OUT} + c_4 T_{CB1234} + d_4 \dot{\omega}_{CA} + e_4 \dot{\omega}_{CB}$$

$$T_{C456} = a_1 T_{IN} + c_1 \dot{\omega}_{CA} + d_1 \dot{\omega}_{CB}$$

$$T_{CB26} = a_2 T_{IN} + b_2 T_{OUT} c_2 T_{C456} d_2 \dot{\omega}_{CA} + e_2 \dot{\omega}_{CB} \quad (5),$$

where $a_3$, $b_3$, $c_3$, $d_3$, $a_4$, $b_4$, $c_4$, $d_4$, and $e_4$ are also values representing theoretical constants for various shift types of the transmission 46. As previously described, CA and CB may be two of CB1234, CB26, C35R, and C456. For example only, however, CA may be C35R and CB may be CB1234. In addition, $T_{OUT}$ may be determined as previously described.

Figure 4A:
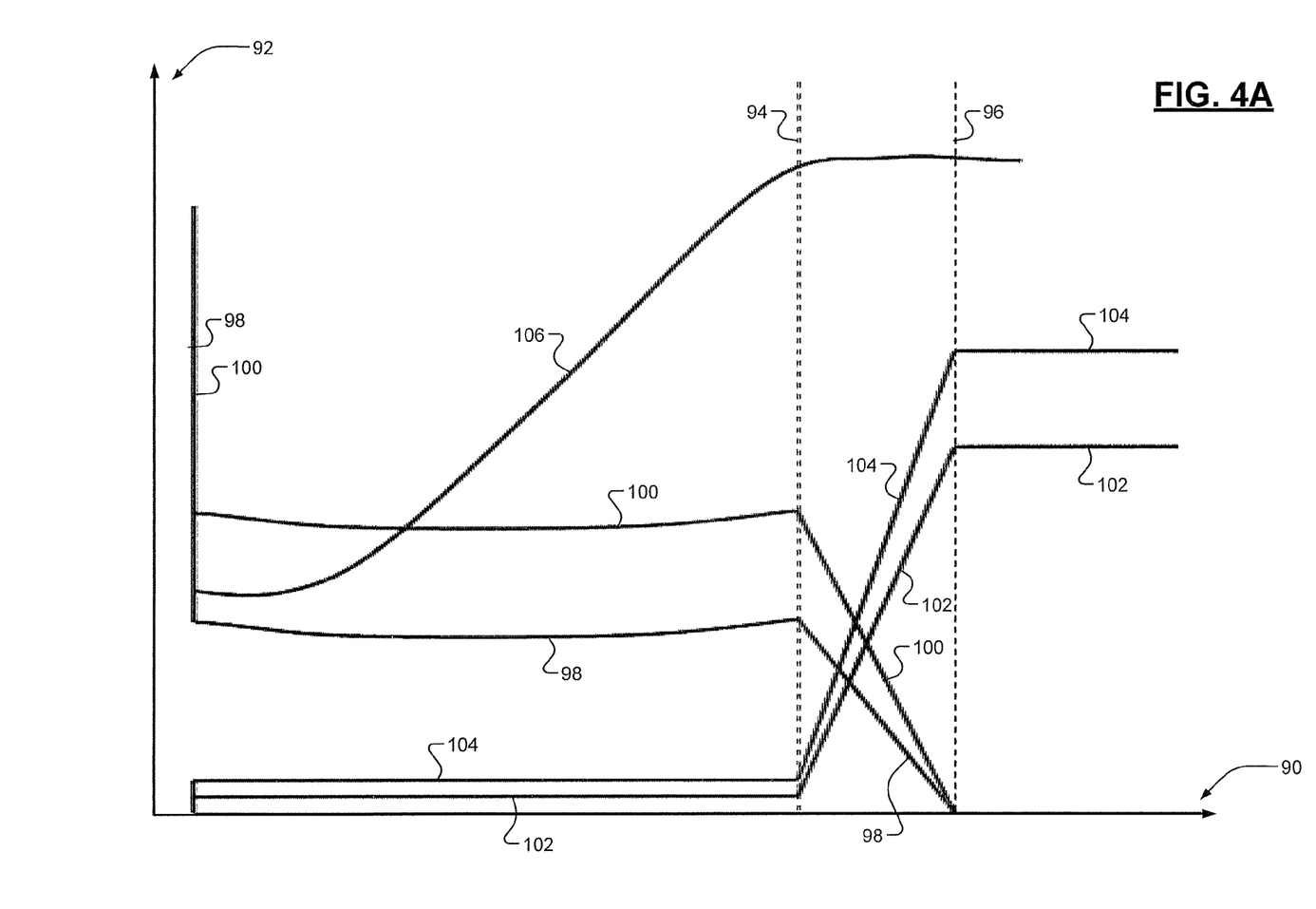
FIG. 4A is a graph illustrating simulated results of an example double transition downshift operation.

Referring now to FIG. 4A, simulated results of the example 6-3 PD operation is shown. In contrast to a conventional, sequential stage double transition shift operation, the illustrated double transition downshift operation is performed in one stage (one inertia phase followed by one torque phase). A horizontal axis 90 represents time and a vertical axis 92 represents clutch torque. The shift operation includes an inertia phase before point 94 and a torque phase between points 94 and 96. During the inertia phase, off-going clutches 98 and 100 are controlled based on their determined torque capacities thereby causing engine speed 106 to increase to a desired level.

During the torque phase, off-going clutches 98 and 100 and on-coming clutches 102 and 104 are controlled based on their determined torque capacities thereby ramping down the off-going clutches 98 and 100 and preparing on-coming clutches 102 and 104 for engagement with an on-coming gear. In other words, during the torque phase, all four transitioning clutches (off-going clutches 98 and 100 and on-coming clutches 102 and 104) are controlled. For example only, off-going clutches 98 and 100 may be ramped to approximately zero capacity.

Figure 4B:
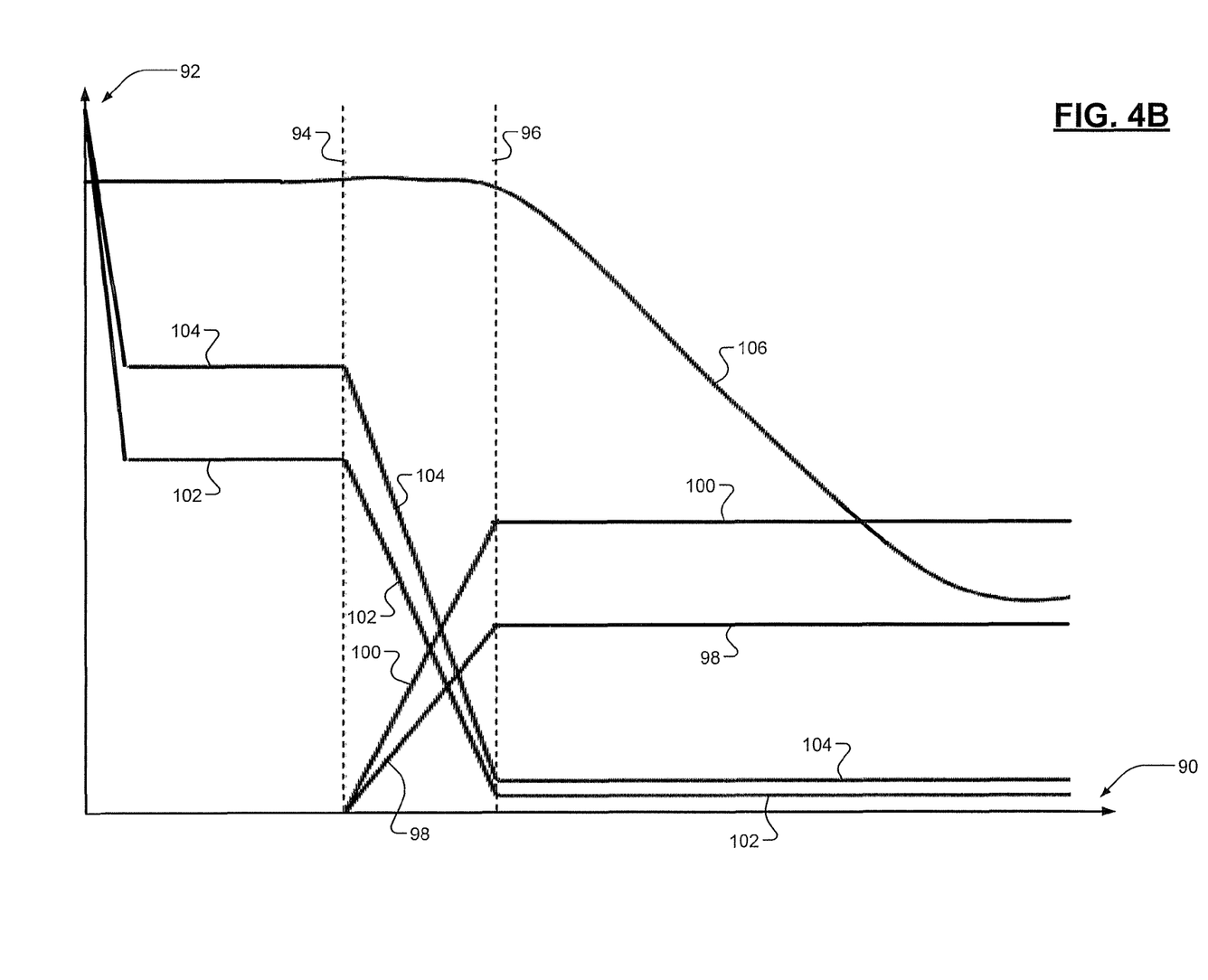
FIG. 4B is a graph illustrating simulated results of an example double transition upshift operation.

FIG. 4B, on the other hand, illustrates simulated results of the example 3-6 upshift operation is shown. Again, in contrast to a conventional, sequential stage double transition shift operation, the illustrated double transition upshift operation is performed in one stage (one torque phase followed by one inertia phase). Note that the reference numerals of FIG. 4B are the same as FIG. 4A and therefore correspond to the same elements or system components. While points 94 and 96 define the endpoints of the torque phase in FIG. 4A, however, in FIG. 4B the inertia phase occurs after point 96.

Figure 5A:
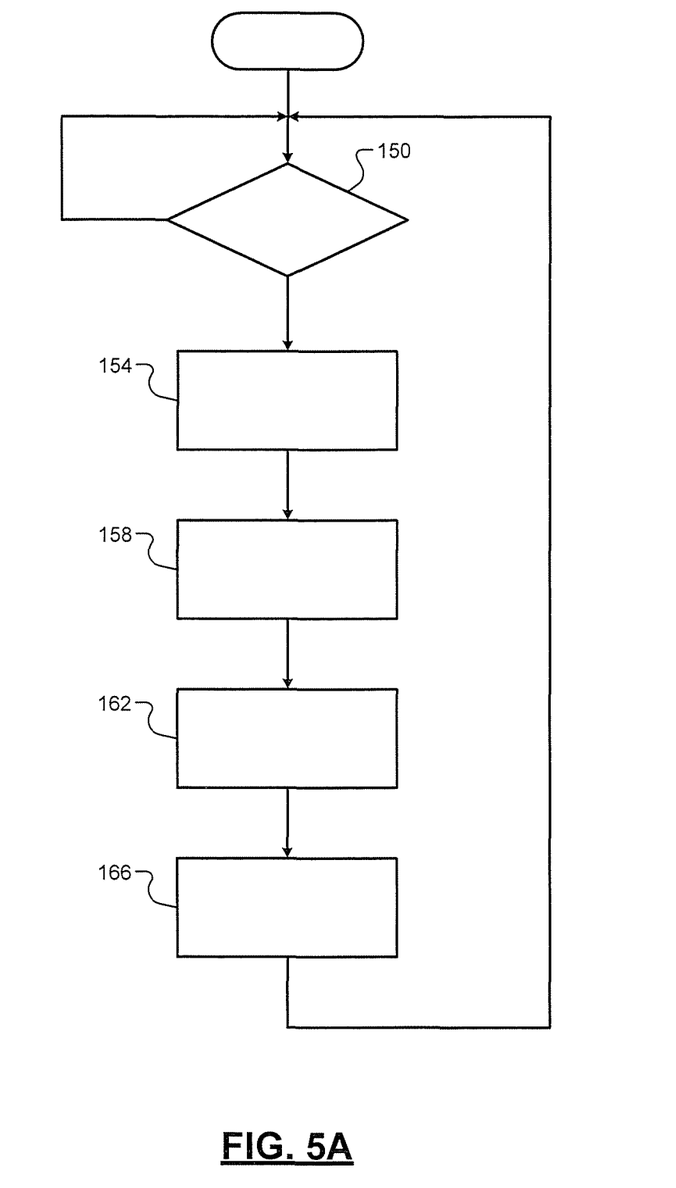
FIG. 5A is a flow diagram of an example method for improved double transition downshift operations.

Referring now to FIG. 5A, an example method for performing faster double transition downshift operations begins at 150. At 150, the control module 60 determines whether a double transition downshift operation is requested. If true, control may proceed to 154. If false, control may return to 150. At 154, the control module 60 determines clutch torques for the two off-going clutches of the four transitioning clutches. At 158, the control module 60 starts the shift operation by controlling the two off-going clutches during the inertia phase of the shift operation based on the determined clutch torques, thereby increasing engine speed to a desired level. At 162, the control module 60 determines clutch torques for each of the four transitioning clutches (the two off-going clutches and the two on-coming clutches). At 166, the control module 60 completes the shift operation by controlling the four transitioning clutches during the torque phase of the shift operation based on the determined clutch torques. Control may then return to 150.

Figure 5B:
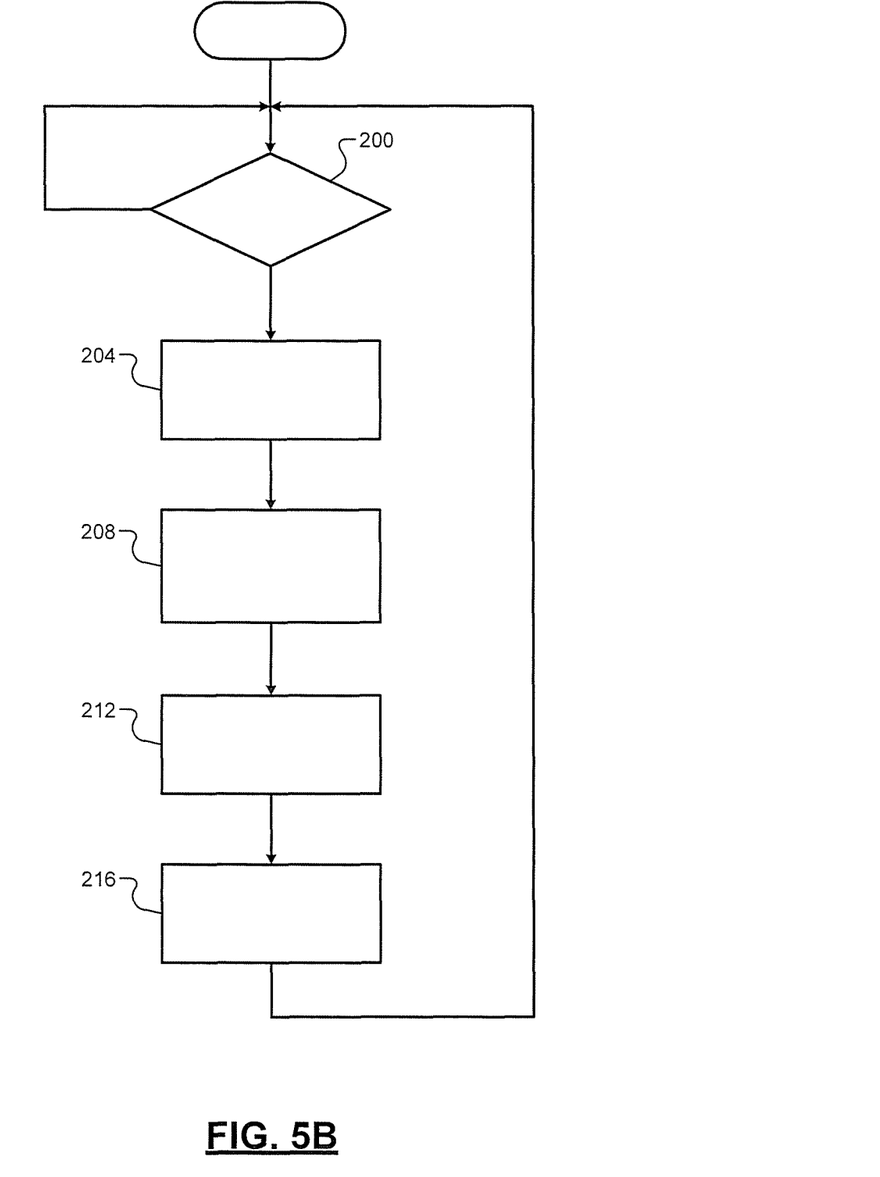
FIG. 5B is a flow diagram of an example method for improved double transition upshift operations.

Referring now to FIG. 5B, an example method for performing faster double transition upshift operations begins at 200. At 200, the control module 60 determines whether a double transition upshift operation is requested. If true, control may proceed to 204. If false, control may return to 200. At 204, the control module 60 determines clutch torques for each of the four transitioning clutches (the two on-coming clutches and the two off-going clutches). At 208, the control module 60 starts the shift operation by controlling the four transitioning clutches during a torque phase of the shift operation based on the determined clutch torques. At 212, the control module 60 determines clutch torques for the two on-coming clutches of the four clutches. At 216, the control module 60 completes the shift operation by controlling the on-coming clutches during an inertia phase of the upshift operation thereby decreasing engine speed to a desired level. Control may then return to 200.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control system for an automatic transmission, the control system comprising:
   a double transition shift detection module that detects whether a double transition shift operation is requested;
   a first clutch control module that controls two of four transitioning clutches of the transmission during an inertia phase of the double transition shift operation; and
   a second clutch control module that controls each of the four transitioning clutches of the transmission during a torque phase of the double transition shift operation,
   wherein torque capacities for each of the four transitioning clutches are determined based on (i) desired clutch slip speeds for two of the four transitioning clutches and (ii) desired input shaft slip speed.

2. The control system of claim 1, wherein desired output shaft torque is determined based on the desired input shaft slip speed.

3. The control system of claim 2, wherein the torque capacities for each of the four transitioning clutches are determined based on (i) the desired clutch slip speeds for two of the four transitioning clutches and (ii) the desired output shaft torque.

4. The control system of claim 3, wherein the four transitioning clutches include first and second on-coming clutches and first and second off-going clutches.

5. The control system of claim 4, wherein the second clutch control module controls the first and second off-going clutches during the inertia phase when the double transition shift operation is a downshift.

6. The control system of claim 5, wherein the inertia phase precedes the torque phase during the downshift, and wherein torque capacities for the first and second off-going clutches during the torque phase are each approximately zero.

7. The control system of claim 4, wherein the second clutch control module controls the first and second on-coming clutches during the inertia phase when the double transition shift operation is an upshift.

8. The control system of claim 7, wherein the torque phase precedes the inertia phase during the upshift, and wherein torque capacities for the first and second off-going clutches during the torque phase are each approximately zero.

9. The control system of claim 1, wherein the double transition shift detection module detects the double transition shift based on (i) whether a transmission shift is requested and (ii) whether the requested transmission shift is one of a plurality of predetermined double transition shifts.

10. A method for controlling an automatic transmission, the method comprising:
    detecting whether a double transition shift operation is requested;
    controlling two of four transitioning clutches of the transmission during an inertia phase of the double transition shift operation;
    controlling each of the four transitioning clutches of the transmission during a torque phase of the double transition shift operation; and
    determining torque capacities for each of the four transitioning clutches based on (i) desired clutch slip speeds for two of the four transitioning clutches and (ii) desired input shaft slip speed.

11. The method of claim 10, further comprising determining desired output shaft torque based on the desired input shaft slip speed.

12. The method of claim 11, further comprising determining the torque capacities for each of the four transitioning clutches based on (i) the desired clutch slip speeds for two of the four transitioning clutches and (ii) the desired output shaft torque.

13. The method of claim 12, wherein the four transitioning clutches include first and second on-coming clutches and first and second off-going clutches.

14. The method of claim 13, further comprising controlling the first and second off-going clutches during the inertia phase when the double transition shift operation is a downshift.

15. The method of claim 14, wherein the inertia phase precedes the torque phase during the downshift, and wherein torque capacities for the first and second off-going clutches during the torque phase are each approximately zero.

16. The method of claim 13, further comprising controlling the first and second on-coming clutches during the inertia phase when the double transition shift operation is an upshift.

17. The method of claim 16, wherein the torque phase precedes the inertia phase during the upshift, and wherein torque capacities for the first and second off-going clutches during the torque phase are each approximately zero.

18. The method of claim 10, further comprising detecting the double transition shift based on (i) whether a transmission shift is requested and (ii) whether the requested transmission shift is one of a plurality of predetermined double transition shifts.

* * * * *